(12) United States Patent
Nishizawa et al.

(10) Patent No.: US 11,650,054 B2
(45) Date of Patent: May 16, 2023

(54) VIBRATOR DEVICE, ELECTRONIC APPARATUS, AND VEHICLE

(71) Applicant: Seiko Epson Corporation, Tokyo (JP)

(72) Inventors: Ryuta Nishizawa, Nagano (JP); Seiichiro Ogura, Minowa (JP); Keiichi Yamaguchi, Ina (JP)

(73) Assignee: SEIKO EPSON CORPORATION

( * ) Notice: Subject to any disclaimer, the term of this patent is extended or adjusted under 35 U.S.C. 154(b) by 0 days.

(21) Appl. No.: 17/679,272

(22) Filed: Feb. 24, 2022

(65) Prior Publication Data

US 2022/0178694 A1 Jun. 9, 2022

Related U.S. Application Data

(63) Continuation of application No. 16/827,809, filed on Mar. 24, 2020, now Pat. No. 11,307,033.

(30) Foreign Application Priority Data

Mar. 25, 2019 (JP) .............................. JP2019-057447

(51) Int. Cl.
*G01C 19/5705* (2012.01)
(52) U.S. Cl.
CPC ................................ *G01C 19/5705* (2013.01)
(58) Field of Classification Search
CPC .... G01C 19/5705; G01C 19/574; H03B 5/32; G01P 3/14
See application file for complete search history.

(56) References Cited

U.S. PATENT DOCUMENTS

| | | | |
|---|---|---|---|
| 7,000,472 B2* | 2/2006 | Kinoshita | G01C 19/56 73/504.16 |
| 2005/0257615 A1* | 11/2005 | Ohta | G01C 19/5719 73/504.12 |
| 2006/0052883 A1* | 3/2006 | Lee | H01J 37/3299 700/28 |
| 2006/0053883 A1 | 3/2006 | Hayashi et al. | |
| 2006/0267458 A1* | 11/2006 | Ishikawa | G01C 19/5628 310/348 |

(Continued)

FOREIGN PATENT DOCUMENTS

| | | |
|---|---|---|
| JP | 2014-089049 A | 5/2014 |
| JP | 2016-176763 A | 10/2016 |

(Continued)

*Primary Examiner* — Xin Y Zhong
(74) *Attorney, Agent, or Firm* — Harness, Dickey & Pierce, P.L.C.

(57) ABSTRACT

Provided is a vibrator device including a vibrator structure body. When the A axis, the B axis, and the C axis are three axes orthogonal to each other, the vibrator structure body includes a vibrator element and a support substrate that is aligned with the vibrator element along the C axis. The vibrator element includes vibrating arms configured to flexurally vibrate along a plane parallel to the A axis and the B axis and along the A axis. The support substrate includes a base that supports the vibrator element, a support that supports the base, and a beam that couples the base and the support. A relationship f0<f1 is satisfied in which f0 is a resonance frequency of a vibration of the vibrator structure body along the B axis and f1 is a drive frequency of the vibrator element.

13 Claims, 11 Drawing Sheets

(56) References Cited

U.S. PATENT DOCUMENTS

| | | |
|---|---|---|
| 2014/0020503 A1 | 1/2014 | Yamaguchi et al. |
| 2015/0276404 A1 | 10/2015 | Nishizawa et al. |
| 2018/0065840 A1 | 3/2018 | Oto |
| 2018/0274922 A1 | 9/2018 | Nishizawa et al. |

FOREIGN PATENT DOCUMENTS

| | | |
|---|---|---|
| JP | 2017-194485 A | 10/2017 |
| JP | 2018-159674 A | 10/2018 |
| JP | 2018-165642 A | 10/2018 |

* cited by examiner

VIBRATOR DEVICE, ELECTRONIC APPARATUS, AND VEHICLE

CROSS-REFERENCE TO RELATED APPLICATIONS

The present application is a continuation of application Ser. No. 16/827,809, filed Mar. 24, 2020, which is based on, and claims priority from JP Application Serial Number 2019-057447, filed Mar. 25, 2019, the disclosures of which are hereby incorporated by reference herein in their entireties.

BACKGROUND

1. Technical Field

The present disclosure relates to a vibrator device, an electronic apparatus, and a vehicle.

2. Related Art

A vibrator element disclosed in JP-A-2017-194485 (Patent Literature 1) includes a vibrator body, a first support portion and a second support portion that support the vibrator body and that are fixed to a package or the like, a pair of beam portions that couple the vibrator body and the first support portion, and a pair of beam portions that couple the vibrator body and the second support portion.

However, since the beam portions have to be formed to fill in a gap of the vibrator body, a shape of the beam portions is limited. Therefore, a frequency design of an unnecessary vibration is limited and it is difficult to implement a vibrator element in which the unnecessary vibration is sufficiently prevented.

SUMMARY

A vibrator device according to an application example of the present disclosure includes a vibrator structure body. When three axes orthogonal to each other are defined as an A axis, a B axis, and a C axis, the vibrator structure body includes a vibrator element and a support substrate that is aligned with the vibrator element along the C axis. The vibrator element includes vibrating arms configured to flexurally vibrate along a plane parallel to the A axis and the B axis and along the A axis. The support substrate includes a base that supports the vibrator element, a support that supports the base, and a beam that couples the base and the support. A relationship $f0<f1$ is satisfied in which $f0$ is a resonance frequency of a vibration of the vibrator structure body along the B axis and $f1$ is a drive frequency of the vibrator element.

In the vibrator device according to the application example of the present disclosure, a relationship $Ka>Kb$ may be satisfied in which $Ka$ is a spring constant of an elastic deformation of the beam along the A axis and $Kb$ is a spring constant of an elastic deformation of the beam along the B axis. In a plan view from a direction along the C axis, the support may include a first support positioned at one side of the A axis with respect to the vibrator element and a second support positioned at another side of the A axis with respect to the vibrator element.

In the vibrator device according to the application example of the present disclosure, in a plan view from a direction along the C axis, the support may include a first support positioned at one side of the B axis with respect to the vibrator element and a second support positioned at another side of the B axis with respect to the vibrator element.

In the vibrator device according to the application example of the present disclosure, the vibrator element may include: an element base; detection arms extending from the element base towards both sides of the B axis; a first coupling arm extending from the element base along the A-axis; a second coupling arm extending from the element base along the A-axis towards an opposite side to a direction in which the first coupling arm extends; and the vibrating arms including: first vibrating arms extending from a tip end of the first coupling arm towards both sides of the B axis, and second vibrating arms extending from a tip end of the second coupling arm towards both sides of the B axis. The element base may be fixed to the base via a joining member.

In the vibrator device according to the application example of the present disclosure, a displacement amplitude magnification of a vibration of the vibrator element along the B axis at the drive frequency $f1$ may be less than 0.8.

In the vibrator device according to the application example of the present disclosure, the vibrator element may include a vibrator substrate and an electrode that is provided on the vibrator substrate. The vibrator substrate and the support substrate may be formed of quartz crystal substrates having the same cut angle.

In the vibrator device according to the application example of the present disclosure, in a plan view from a direction along the C axis, the support substrate may overlap the vibrating arm.

In the vibrator device according to the application example of the present disclosure, the vibrator element may be a physical quantity sensor element configured to detect a physical quantity.

An electronic apparatus according to an application example of the present disclosure includes: the vibrator device; and a signal processing circuit configured to perform signal processing based on an output signal from the vibrator device.

A vehicle according to an application example of the present disclosure includes: the vibrator device; and a signal processing circuit configured to perform signal processing based on an output signal from the vibrator device.

DESCRIPTION OF EXEMPLARY EMBODIMENTS

Hereinafter, a vibrator device, an electronic apparatus, and a vehicle according to the present disclosure will be described in detail based on embodiments shown in the accompanying drawings.

First Embodiment

Figure 1:
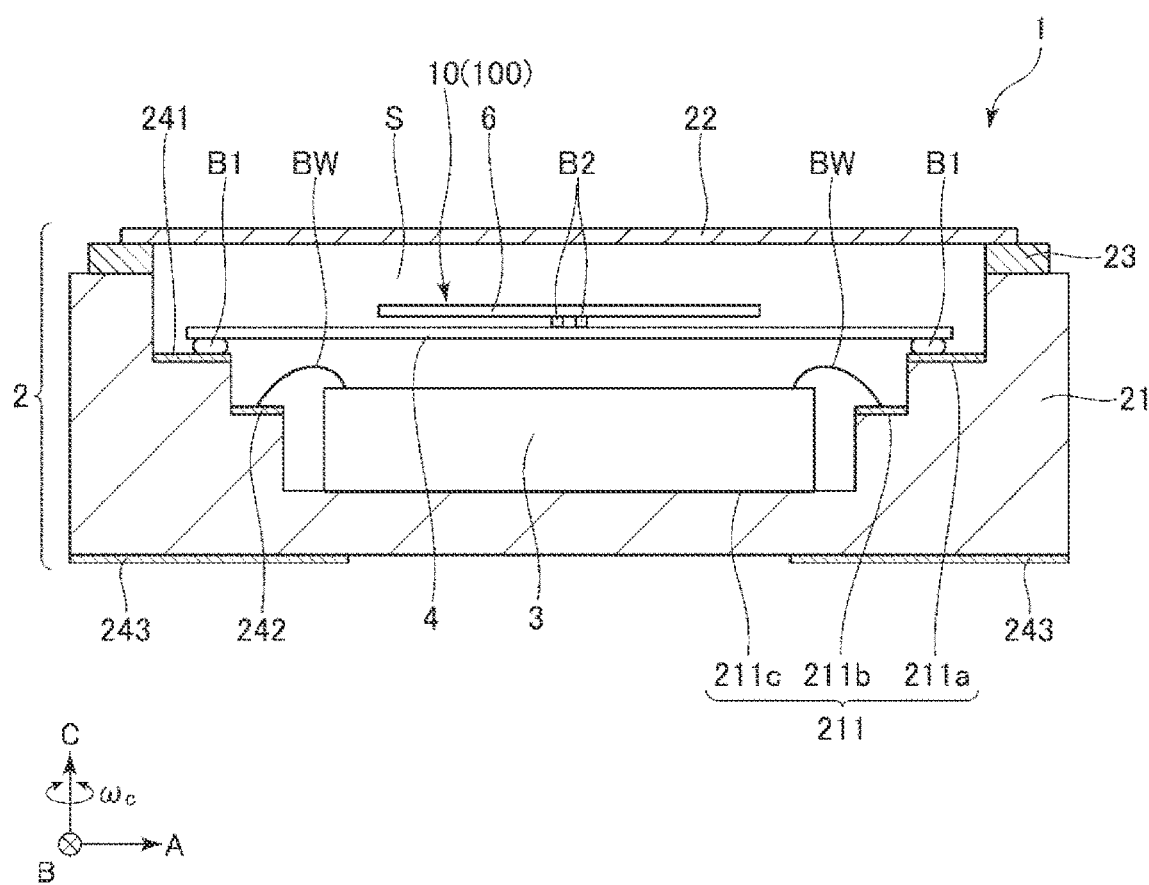
FIG. 1 is a cross-sectional view showing a vibrator device according to a first embodiment.
Figure 2:
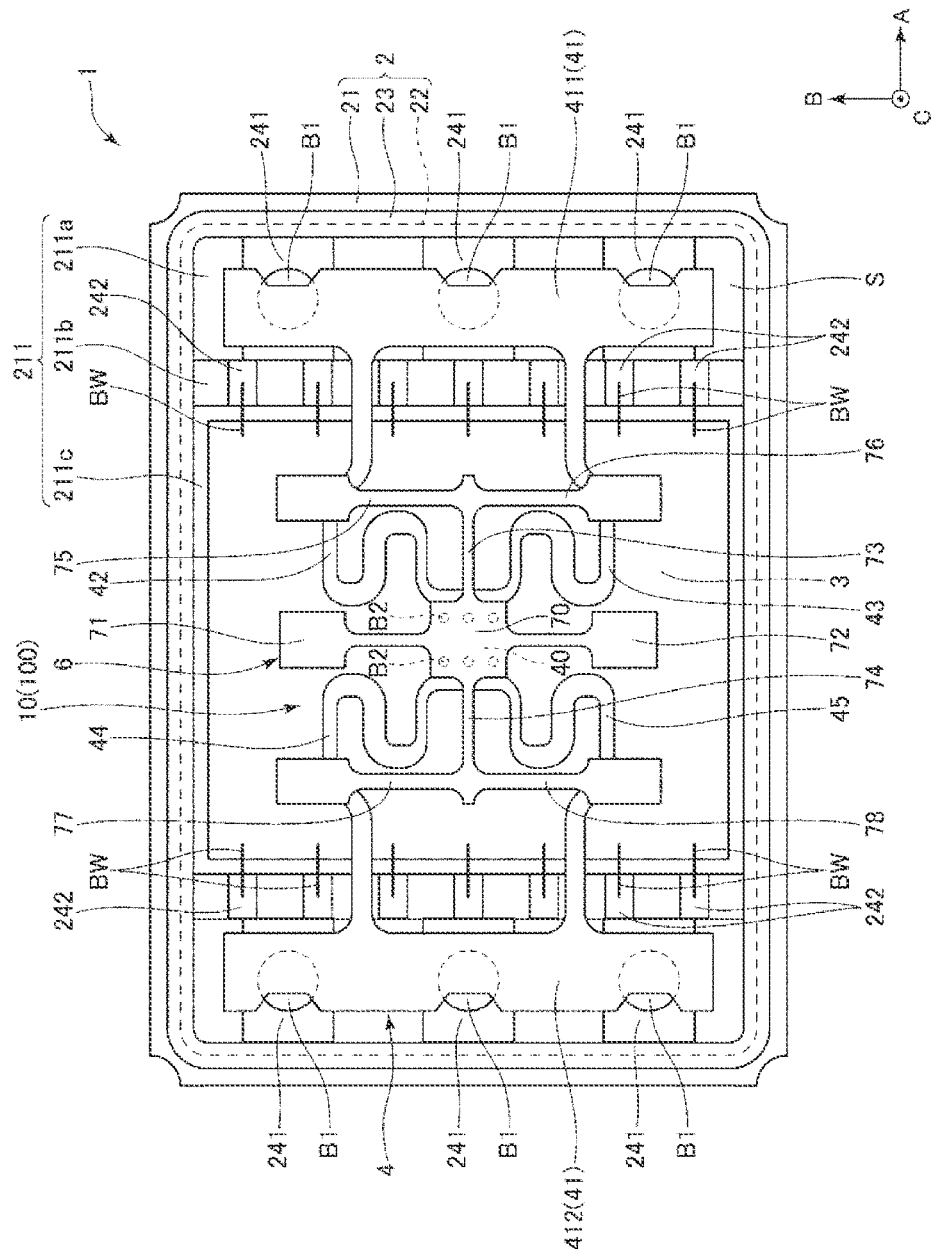
FIG. 2 is a plan view showing the vibrator device shown in FIG. 1.
Figure 3:
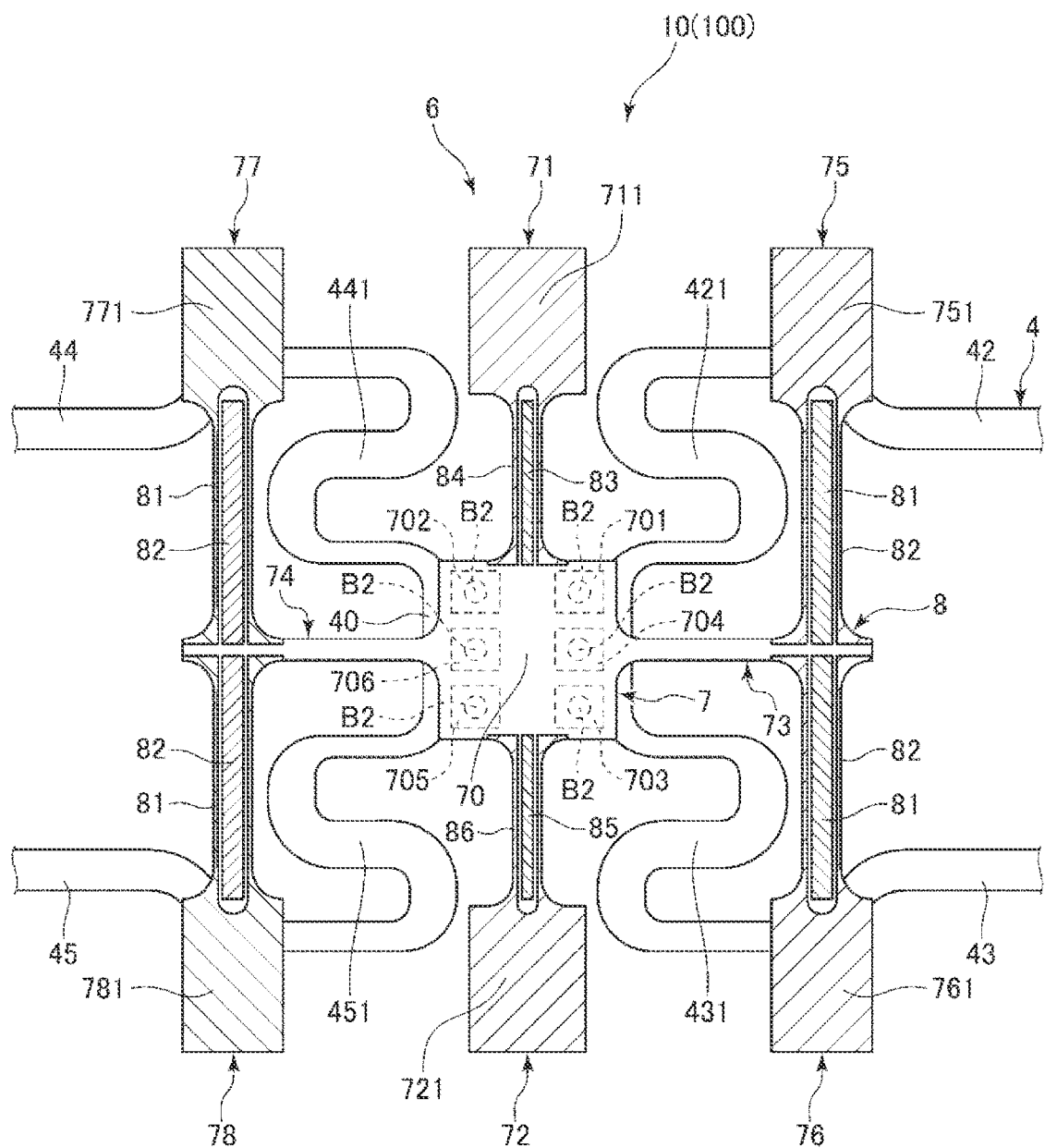
FIG. 3 is a plan view showing a vibrator element that is provided in the vibrator device shown in FIG. 1.
Figure 3:
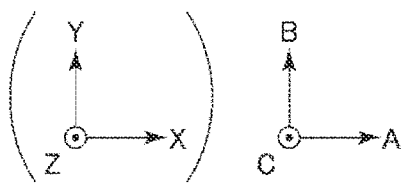
Figure 4:
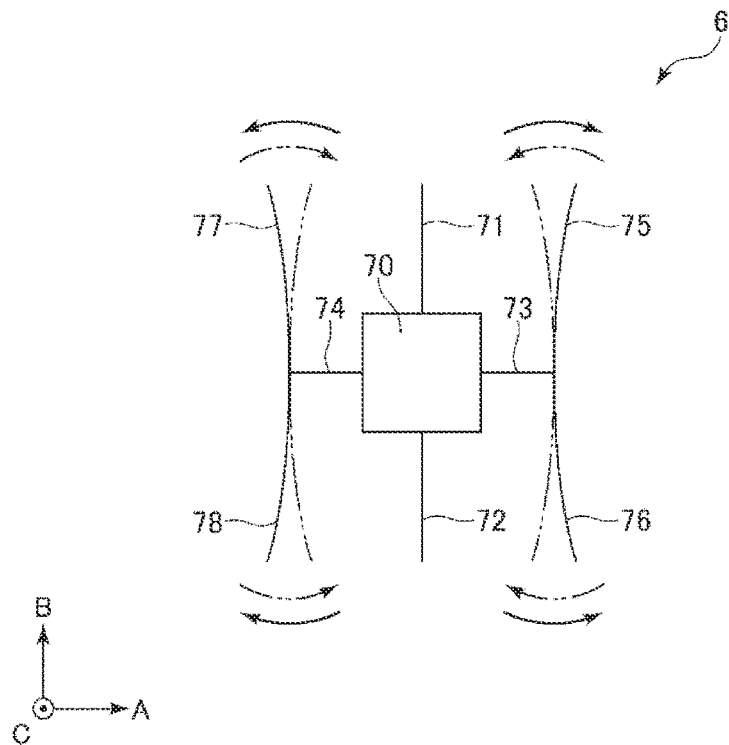
FIG. 4 is a schematic diagram showing driving of the vibrator element shown in FIG. 3.
Figure 5:
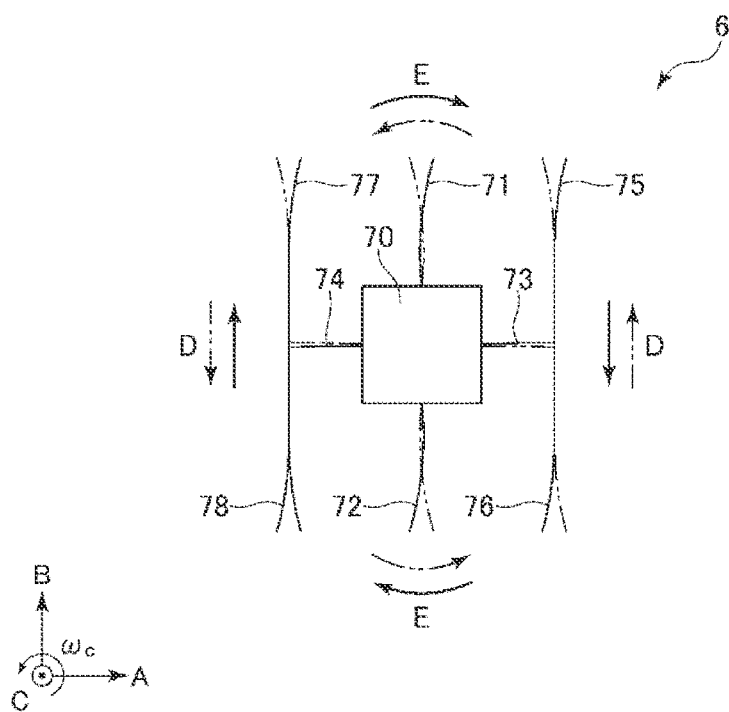
FIG. 5 is a schematic diagram showing driving of the vibrator element shown in FIG. 3.
Figure 6:
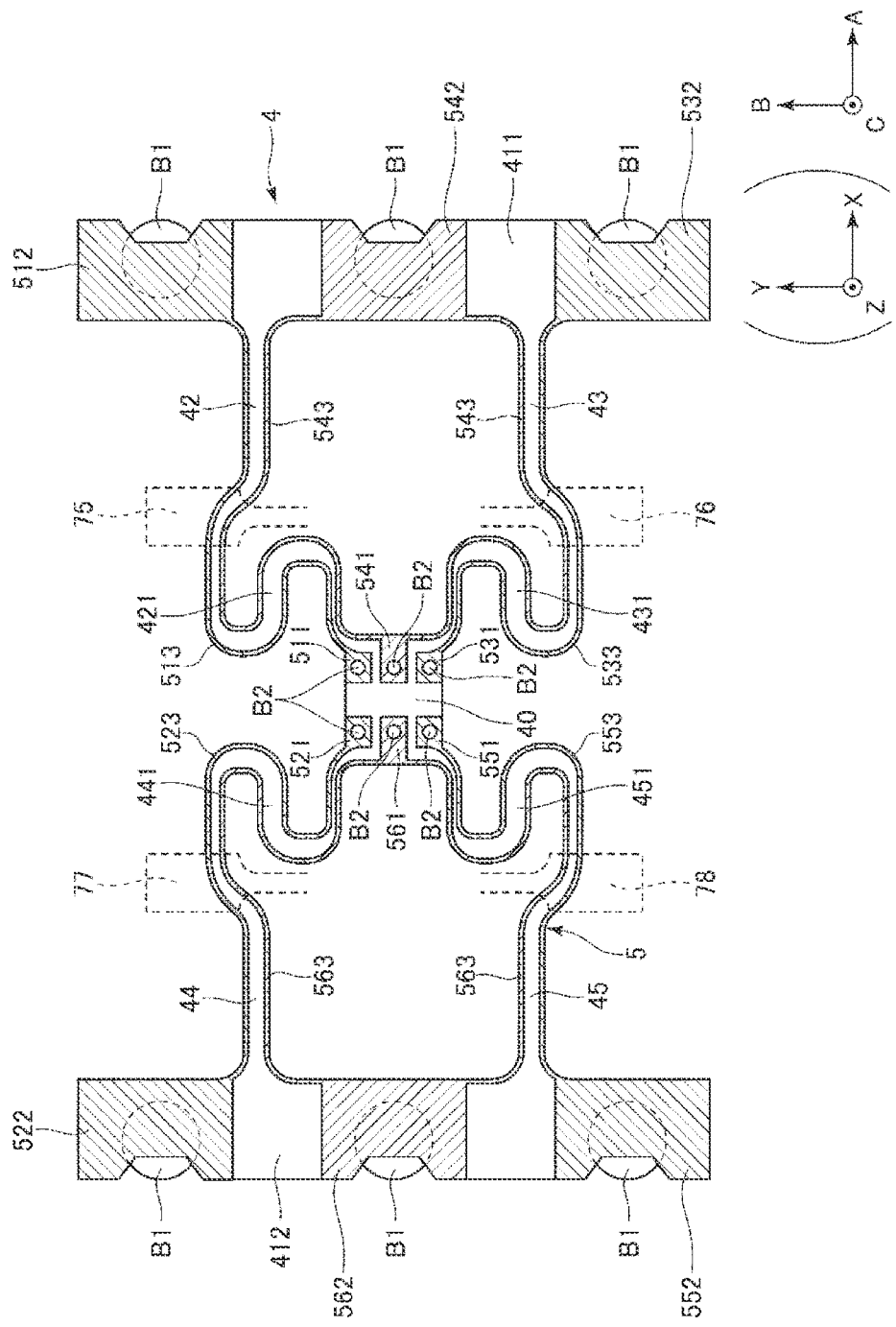
FIG. 6 is a plan view showing a support substrate that is provided in the vibrator device shown in FIG. 1.
Figure 7:
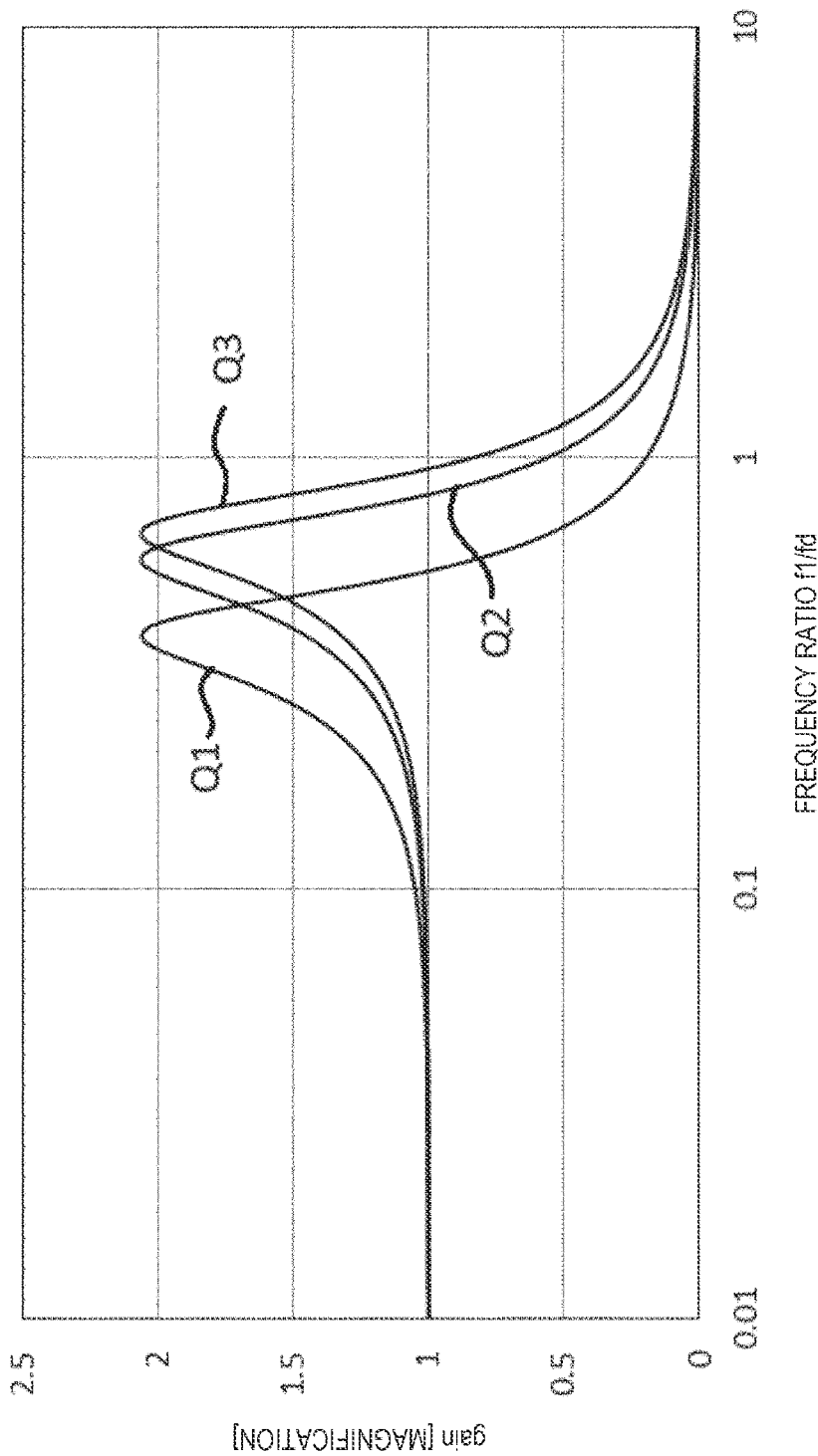
FIG. 7 is a graph showing a relationship between a frequency ratio $f1/fd$ and a displacement amplitude magnification (gain) of an unnecessary vibration at a drive frequency $f1$.
Figure 8:
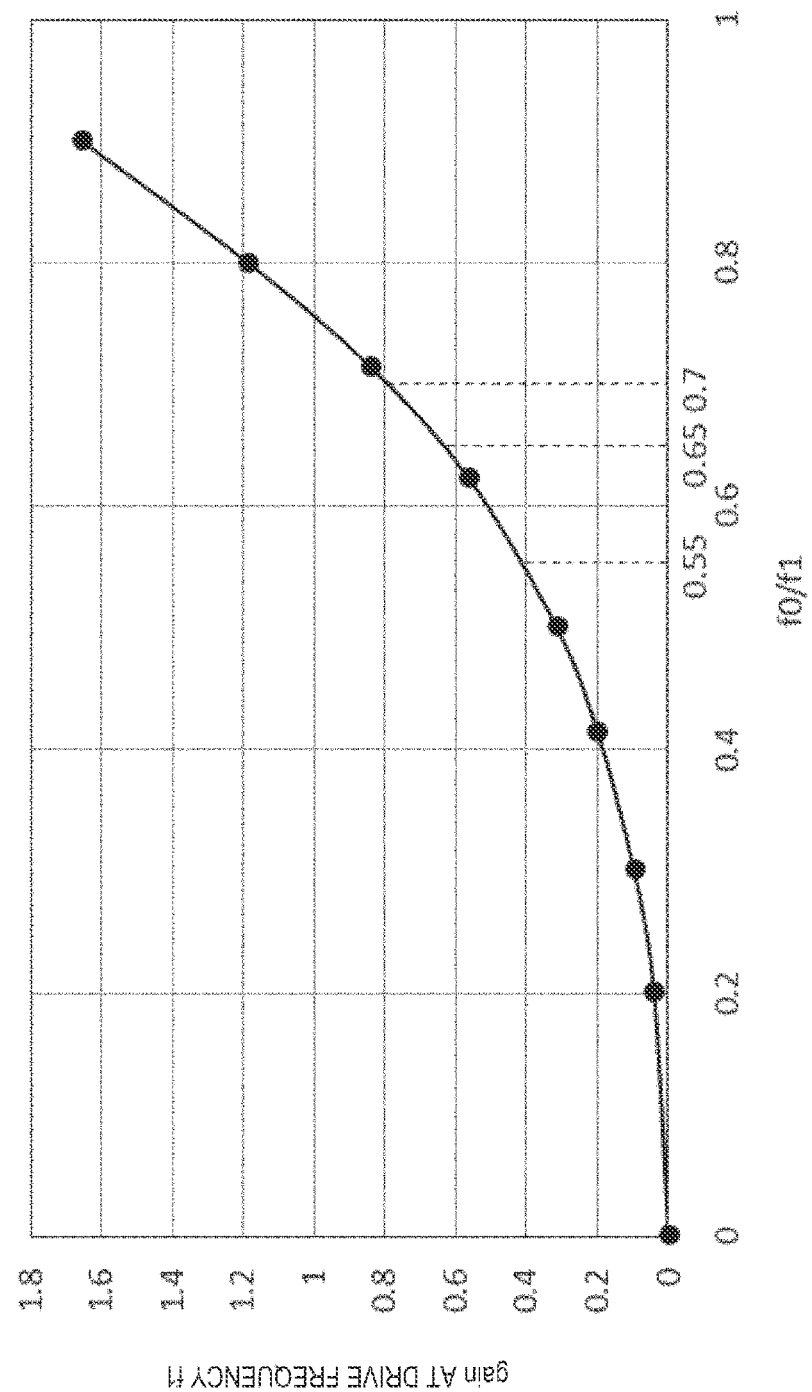
FIG. 8 is a graph showing a relationship between $f0/f1$ and the displacement amplitude magnification (gain) of the unnecessary vibration at the drive frequency $f1$ when the frequency ratio $f1/fd=1$.

FIG. 1 is a cross-sectional view showing a vibrator device according to the first embodiment. FIG. 2 is a plan view showing the vibrator device shown in FIG. 1. FIG. 3 is a plan view showing a vibrator element that is provided in the vibrator device shown in FIG. 1. FIGS. 4 and 5 are schematic views showing driving of the vibrator element shown in FIG. 3. FIG. 6 is a plan view showing a support substrate that is provided in the vibrator device shown in FIG. 1. FIG. 7 is a graph showing a relationship between a frequency ratio f1/fd and a displacement amplitude magnification (gain) of an unnecessary vibration at a drive frequency f1. FIG. 8 is a graph showing a relationship between f0/f1 and the displacement amplitude magnification (gain) of the unnecessary vibration at the drive frequency f1 when the frequency ratio f1/fd=1. FIGS. 1 to 6 show an A axis, a B axis, and a C axis which are three axes orthogonal to each other for the convenience of description. Hereinafter, an arrow tip end side of each axis is referred to as a "positive side" and an opposite side is referred to as a "negative side". A positive side of the C axis is referred to as "upper" and a negative side of the C axis is referred to as "lower". A plan view from a direction along the C axis is simply referred to as a "plan view".

A vibrator device 1 shown in FIG. 1 is a physical quantity sensor that detects an angular velocity ωc with the C axis serving as a detection axis. Since the vibrator device 1 serves as a physical quantity sensor, the vibrator device 1 can be mounted in various types of electronic apparatus, and the vibrator device 1 has high convenience. Such a vibrator device 1 includes a package 2, and a circuit element 3, a support substrate 4, and a vibrator element 6 that are accommodated in the package 2.

The package 2 includes a base 21 having a recess 211 with an opening formed on an upper surface of the base 21, and a lid 22 joined, via a joining member 23, to the upper surface of the base 21 so as to close the opening of the recess 211. The recess 211 forms an internal space S inside the package 2. The circuit element 3, the support substrate 4, and the vibrator element 6 are accommodated in the internal space S. For example, the base 21 can be formed of ceramics such as alumina and the lid 22 can be formed of a metal material such as Kovar. However, a constituent material of the base 21 and the lid 22 is not particularly limited.

The internal space S is airtight, and is in a decompressed state, preferably in a state close to a vacuum state. Accordingly, a vibration characteristic of the vibrator element 6 is improved. However, an atmosphere of the internal space S is not particularly limited and may be in an atmospheric pressure state, a pressurized state, or the like.

The recess 211 is configured with a plurality of recesses including a recess 211a that is opened on the upper surface of the base 21, a recess 211b that is opened on a bottom surface of the recess 211a and has an opening width smaller than an opening width of the recess 211a, and a recess 211c that is opened on a bottom surface of the recess 211b and has an opening width smaller than the opening width of the recess 211b. The support substrate 4 is fixed on the bottom surface of the recess 211a in a state in which the support substrate 4 supports the vibrator element 6. The circuit element 3 is fixed on the bottom surface of the recess 211c.

As shown in FIG. 2, the vibrator element 6, the support substrate 4, and the circuit element 3 overlap with each other in the internal space S in a plan view. In other words, the vibrator element 6, the support substrate 4, and the circuit element 3 are aligned along the C axis. Accordingly, a planar area of the package 2 can be prevented from spreading in directions along the A axis and the B axis, and miniaturization of the vibrator device 1 can be achieved. The support substrate 4 is positioned between the vibrator element 6 and the circuit element 3 and supports the vibrator element 6 from a lower side, that is, from the negative side of the C axis.

As shown in FIGS. 1 and 2, a plurality of internal terminals 241 are provided on the bottom surface of the recess 211a, a plurality of internal terminals 242 are provided on the bottom surface of the recess 211b, and a plurality of external terminals 243 are provided on a lower surface of the base 21. The internal terminals 241, 242 and the external terminals 243 are electrically coupled to each other via wires (not shown) provided in the base 21. The internal terminals 241 are electrically coupled to the vibrator element 6 via conductive joining members B1 and B2 and the support substrate 4, and the internal terminals 242 are electrically coupled to the circuit element 3 via bonding wires BW.

The vibrator element 6 is an angular velocity sensor element that serves as a physical quantity sensor and can detect an angular velocity ωc with the C axis serving as a detection axis. As shown in FIG. 3, the vibrator element 6 includes a vibrator substrate 7 and an electrode 8 that is provided on a surface of the vibrator substrate 7. The vibrator substrate 7 is formed of a Z-cut quartz crystal substrate and includes an element base 70 positioned at a center of the element, detection arms 71 and 72 extending from the element base 70 towards both sides of the B axis, a first coupling arm 73 extending from the element base 70 along the A axis, a second coupling arm 74 extending from the element base 70 along the A axis towards an opposite side to a direction in which the first coupling arm 73 extends, drive arms 75 and 76 that serve as vibrating arms extending from a tip end of the first coupling arm 73 towards both sides of the B axis, and drive arms 77 and 78 that serve as vibrating arms extending from a tip end of the second coupling arm 74 towards both sides of the B axis. The Z-cut quartz crystal substrate spreads in an X-Y plane defined by an X axis serving as an electrical axis and a Y axis serving as a mechanical axis, which are crystallographic axes of the quartz crystal, and has a thickness in a direction along a Z axis serving as an optical axis.

Wide portions 711 and 721 wider than portions at base end sides are respectively provided at tip ends of the detection arms 71 and 72. Wide portions 751, 761, 771, and 781 wider than portions at base end sides are respectively provided at tip ends of the drive arms 75, 76, 77, and 78.

The electrode 8 includes drive signal electrodes 81, drive ground electrodes 82, first detection signal electrodes 83, first detection ground electrodes 84, second detection signal electrodes 85, and second detection ground electrodes 86. The drive signal electrodes 81 are provided on upper surfaces and lower surfaces of the drive arms 75 and 76, and on both side surfaces of the drive arms 77 and 78. On the other hand, the drive ground electrodes 82 are provided on both side surfaces of the drive arms 75 and 76 and on upper surfaces and lower surfaces of the drive arms 77 and 78. The first detection signal electrodes 83 are provided on an upper surface and a lower surface of the detection arm 71, and the first detection ground electrodes 84 are provided on both side surfaces of the detection arm 71. On the other hand, the second detection signal electrodes 85 are provided on an upper surface and a lower surface of the detection arm 72, and the second detection ground electrodes 86 are provided on both side surfaces of the detection arm 72.

The electrodes 81 to 86 are respectively routed to a lower surface of the element base 70. Therefore, a terminal 701 electrically coupled to the drive signal electrodes 81, a terminal 702 electrically coupled to the drive ground electrodes 82, a terminal 703 electrically coupled to the first detection signal electrodes 83, a terminal 704 electrically coupled to the first detection ground electrodes 84, a terminal 705 electrically coupled to the second detection signal electrodes 85, and a terminal 706 electrically coupled to the second detection ground electrodes 86 are provided on the lower surface of the element base 70.

As shown in FIG. 3, the electrode 8 is also provided at the wide portions 751 to 781 of the drive arms 75 to 78 in the vibrator element 6. In the vibrator device 1, the electrode 8 at the wide portions 751 to 781 is irradiated with laser light from the positive side of the C axis so that at least a part of the electrode 8 is removed before the lid 22 is joined to the base 21, thereby reducing a mass of the drive arms 75 to 78 and adjusting a vibration balance or a drive frequency of the vibrator element 6. Hereinafter, this step is also referred to as a "drive frequency adjustment step".

The above-described vibrator element 6 detects the angular velocity $\omega c$ as follows. First, when a drive signal is applied between the drive signal electrode 81 and the drive ground electrode 82, the drive arms 75 to 78, as shown in FIG. 4, flexurally vibrate along the plane parallel to the A axis and the B axis and along the A axis. Hereinafter, this drive mode is referred to as a drive vibration mode. When the angular velocity $\omega c$ is applied to the vibrator element 6 in a state in which the drive arms 75 to 78 are driven in the drive vibration mode, a detection vibration mode shown in FIG. 5 is newly excited. A Coriolis force is applied on the drive arms 75 to 78 to excite a vibration in a direction indicated by arrows D in the detection vibration mode. In response to the vibration, the detection arms 71 and 72 flexurally vibrate in a direction indicated by arrows E. In the detection vibration mode, a charge generated at the detection arm 71 is extracted as a first detection signal between the first detection signal electrodes 83 and the first detection ground electrodes 84, and a charge generated at the detection arm 72 is extracted as a second detection signal between the second detection signal electrodes 85 and the second detection ground electrodes 86. The angular velocity $\omega c$ can be detected based on the first and second detection signals.

As shown in FIG. 1, the circuit element 3 is fixed on the bottom surface of the recess 211c. The circuit element 3 includes a drive circuit that drives the vibrator element 6 and a detection circuit that detects the angular velocity $\omega c$ applied to the vibrator element 6. However, the circuit element 3 is not particularly limited and may include other circuits such as a temperature compensation circuit.

As shown in FIG. 2, the support substrate 4 includes a base 40, a support 41 including a first support 411 and a second support 412 that support the base 40 and are separately provided on both sides of the base 40 along the A axis, a pair of beams 42 and 43 that couple the base 40 and the first support 411, and a pair of beams 44 and 45 that couple the base 40 and the second support 412.

The element base 70 of the vibrator element 6 is fixed on the base 40 via the conductive joining members B2, and the first support 411 and the second support 412 are separately fixed on the bottom surface of the recess 211a via the joining members B1. That is, the vibrator element 6 is fixed on the base 21 via the support substrate 4. In this manner, the support substrate 4 is interposed between the vibrator element 6 and the base 21 so that the support substrate 4 can absorb and reduce a stress transmitted from the base 21 and the stress is less likely to be transmitted to the vibrator element 6. Therefore, a vibration characteristic of the vibrator element 6 can be effectively prevented from deteriorating and changing.

Particularly, the first and second supports 411 and 412 are separately positioned on outer sides of the vibrator element 6 in a plan view according to the present embodiment. Specifically, the first support 411 is positioned at the positive side of the A axis with respect to the vibrator element 6, and the second support 412 is positioned at the negative side of the A axis with respect to the vibrator element 6. Accordingly, since the first and second supports 411 and 412 can be sufficiently separated from each other with the vibrator element 6 interposed therebetween, the support substrate 4 can support the vibrator element 6 in a more stable manner. Therefore, the vibration characteristic of the vibrator element 6 is improved.

The joining members B1 and B2 are not particularly limited as long as the joining members B1 and B2 have conductivity and joinability. Examples of the joining members B1 and B2 may include various metal bumps such as a gold bump, a silver bump, a copper bump, and a solder bump, and may include a conductive adhesive obtained by dispersing a conductive filler such as a silver filler in various adhesives such as a polyimide based adhesive, an epoxy based adhesive, a silicone based adhesive, and an acrylic based adhesive. When the former metal bump is used as the joining members B1 and B2, a gas can be prevented from being generated from the joining members B1 and B2, and an environmental change of the internal space S, particularly a pressure raise, can be effectively prevented. On the other hand, when the latter conductive adhesive is used as the joining members B1 and B2, the joining members B1 and B2 are relatively soft, and the above-described stress can be absorbed and reduced in the joining members B1 and B2 as well.

In the present embodiment, a conductive adhesive is used as the joining members B1 and a metal bump is used as the joining members B2. By using the conductive adhesive as the joining members B1, which join the support substrate 4 and the base 21 which use different materials, a thermal stress caused by a difference between thermal expansion coefficients between the support substrate 4 and the base 21 can be effectively absorbed and reduced by the joining members B1. On the other hand, since the support substrate 4 and the vibrator element 6 are joined by the six joining members B2 provided in a relatively narrow area, by using the metal bump as the joining members B2, it is possible to effectively prevent a wet spreading like the conductive adhesive, and the joining members B2 can be effectively prevented from contacting with one another.

As shown in FIG. 3, the beams 42, 43, 44, and 45 respectively have bent portions 421, 431, 441, and 451 that meander in an S-shape in intermediate portions of the beams 42, 43, 44, and 45, and are likely to be elastically deformed in a direction along the A axis and in a direction along the B axis. Therefore, the stress transmitted from the base 21 can be more effectively absorbed and reduced by the beams 42 to 45. However, a shape of each of the beams 42 to 45 is not particularly limited, and for example, may be a straight shape in which the bent portions 421 to 451 are omitted. At least one of the beams 42 to 45 may have a different shape from the other ones of the beams 42 to 45.

In addition, the drive arm 75 of the vibrator element 6 overlaps the beam 42, the drive arm 76 overlaps the beam 43, the drive arm 77 overlaps the beam 44, and the drive arm 78 overlaps the beam 45 in a plan view. Therefore, when the drive arms 75 to 78 are bent in the direction along the C axis due to impact or the like, the drive arms 75 to 78 are brought into contact with the beams 42 to 45 and are prevented from being excessively bent beyond the beams 42 to 45. That is, the beams 42 to 45 function as stoppers for preventing the drive arms 75 to 78 from being excessively deformed in the direction along the C axis. Accordingly, the vibrator element 6 can be prevented from being broken down. Particularly, since the beams 42 to 45 are soft portions in the support substrate 4, a contacting impact that is caused by contacting the drive arms 75 to 78 with the beams 42 to 45 can be relieved. In the present embodiment, since tip ends of the drive arms 75 to 78, that is, the wide portions 751 to 781 overlap the beams 42 to 45, the drive arms 75 to 78 can be effectively prevented from being excessively deformed in the direction along the C axis.

However, the present disclosure is not limited thereto. For example, the base 40 and/or the first and second supports 411 and 412 may overlap the drive arms 75 to 78, and any one of the base 40, the first and second supports 411 and 412, and the beams 42 to 45 may not overlap the drive arms 75 to 78.

The support substrate 4 is formed of a quartz crystal substrate. In this manner, by forming the support substrate 4 with a quartz crystal substrate that is the same with the vibrator substrate 7, so that thermal expansion coefficients of the support substrate 4 and the vibrator substrate 7 can be made equal. Therefore, a thermal stress caused by a difference between the thermal expansion coefficients of the support substrate 4 and the vibrator substrate 7 is substantially not generated, and the vibrator element 6 is less likely to be subjected to the stress. Therefore, a vibration characteristic of the vibrator element 6 can be more effectively prevented from deteriorating and changing.

Particularly, the support substrate 4 is formed of a quartz crystal substrate having the same cut angle with the vibrator substrate 7 that is provided in the vibrator element 6. In the present embodiment, since the vibrator substrate 7 is formed of the Z-cut quartz crystal substrate, the support substrate 4 is also formed of a Z-cut quartz crystal substrate. Directions of crystallographic axes of the support substrate 4 coincide with directions of crystallographic axes of the vibrator substrate 7. That is, the directions along the X axis, the directions along the Y axis, and the directions along the Z axis of the support substrate 4 and the vibrator substrate 7 coincide with each other, respectively. Since a quartz crystal has different thermal expansion coefficients in the direction along the X axis, in the direction along the Y axis, and in the direction along the Z axis, by the support substrate 4 and the vibrator substrate 7 having the same cut angle, and having directions of the crystallographic axes coincide with each other, the above-described thermal stress is less likely to be generated between the support substrate 4 and the vibrator substrate 7. Therefore, the vibrator element 6 is less likely to be subjected to the stress, and a vibration characteristic of the vibrator element 6 is more effectively prevented from deteriorating or changing.

The support substrate 4 is not limited thereto. For example, the support substrate 4 has the same cut angle as the vibrator substrate 7, but may also have directions of the crystallographic axes different from the directions of the crystallographic axes of the vibrator substrate 7. The support substrate 4 may be formed of a quartz crystal substrate having a cut angle different from the cut angle of the vibrator substrate 7. In addition, the support substrate 4 may not be formed of a quartz crystal substrate. In this case, a constituent material of the support substrate 4 may be a material having a thermal expansion coefficient difference from the quartz crystal smaller than a thermal expansion coefficient difference between the quartz crystal and a constituent material of the base 21.

A wiring 5 that electrically couples the vibrator element 6 and the internal terminals 241 is provided on the support substrate 4. As shown in FIG. 6, the wiring 5 includes terminals 511, 521, 531, 541, 551, and 561 that are provided on the base 40, terminals 512, 532, and 542 that are provided on the first support 411, and terminals 522, 552, and 562 that are provided on the second support 412. The wiring 5 includes a lead wire 513 that couples the terminal 511 and the terminal 512 through the beam 42, a lead wire 523 that couples the terminal 521 and the terminal 522 through the beam 44, a lead wire 533 that couples the terminal 531 and the terminal 532 through the beam 43, a lead wire 543 that couples the terminal 541 and the terminal 542 through the beams 42 and 43, a lead wire 553 that couples the terminal 551 and the terminal 552 through the beam 45, and a lead wire 563 that couples the terminal 561 and the terminal 562 through the beams 44 and 45.

The terminals 511 to 561 provided on the base 40 are electrically coupled, via the joining members B2, to the terminals 701 to 706 provided on the element base 70 of the vibrator element 6, and the terminals 512 to 562 provided on the first and second supports 411 and 412 are electrically coupled, via the joining members B1, to the internal terminals 241, which are not shown. Accordingly, the vibrator element 6 and the circuit element 3 are electrically coupled.

A configuration of the vibrator device 1 is briefly described as above. Here, for example, when a weight balance of the drive arms 75 to 78 is not sufficiently adjusted in the drive frequency adjustment step of the vibrator substrate 7 and a gravity center of the vibrator element 6 deviates from a center of the element in the vibrator element 6 described above, an unnecessary vibration in which the vibrator element 6 vibrates along the B axis in the drive vibration mode (hereinafter, simply referred to as an "unnecessary vibration") occurs. When the unnecessary vibration occurs, a vibration leakage of the vibrator element 6 increases. Accordingly, a Q value decreases and the vibration characteristic of the vibrator element 6 is deteriorated.

Therefore, the vibrator device 1 has a configuration in which the unnecessary vibration of the vibrator element 6 is attenuated by the support substrate 4 that supports the vibrator element 6 and the vibration characteristic of the vibrator element 6 is prevented from deteriorating. Hereinafter, the configuration will be described in detail. Hereinafter, a structure body including the vibrator element 6 and the support substrate 4 is referred to as a "vibrator structure body 10". The vibrator structure body 10 includes a vibrator system 100. The vibrator system 100 includes a mass portion and a spring portion. The mass portion includes the base 40 and the vibrator element 6, and the spring portion includes the four beams 42 to 45.

As described above, the support substrate 4 that supports the vibrator element 6 is formed separately from the vibrator element 6, and the support substrate 4 overlaps the vibrator element 6 along the C axis in the vibrator device 1. Accordingly, the support substrate 4 can be freely designed without being baffled by the vibrator element 6. A degree of freedom of the design of the support substrate 4 increases, so that the design of the support substrate 4 is more applicable, and the unnecessary vibration of the vibrator element 6 can be more effectively prevented.

The vibrator device 1 according to the present embodiment satisfies a relationship f0<f1 in which a resonance frequency of a vibration of the vibrator structure body 10, that is, the vibrator system 100 along the B axis, is f0, and a drive frequency of the vibrator element 6 alone in the drive vibration mode is f1. Since the unnecessary vibration of the vibrator element 6 is caused by vibration of the drive arms 75 to 78 in the drive vibration mode, a frequency of the unnecessary vibration is substantially equal to the drive frequency f1. Therefore, the relationship f0<f1 is set so as to generate a difference between the frequency of the unnecessary vibration, which is substantially equal to f1, and the resonance frequency f0. In other words, the frequency of the unnecessary vibration deviates from the resonance frequency f0, and a resonance of the vibrator system 100 in response to the unnecessary vibration can be prevented. Therefore, the unnecessary vibration of the vibrator element 6 can be effectively attenuated by the support substrate 4.

Here, a relationship f0>f1 may be satisfied in order to generate a difference between the resonance frequency f0 and the drive frequency f1. However, when f0>f1, it is required to reduce a weight of the mass portion of the vibrator system 100 or increase a spring constant of the spring portion of the vibrator system 100. In the former case of reducing the weight of the mass portion of the vibrator system 100, for example, a measure may be taken to reduce a size of the vibrator element 6. If the size of the vibrator element 6 is reduced, the vibration characteristic of the vibrator element 6 is deteriorated accordingly. On the other hand, in the latter case of increasing the spring constant of the spring portion of the vibrator system 100, a measure may be taken to harden the beams 42 to 45. If the beams 42 to 45 are hardened, a stress from the package 2 is likely to be transmitted to the vibrator element 6 along the support substrate 4. As described above, the vibration characteristic of the vibrator element 6 is deteriorated due to other factors in the case of f0>f1. In contrast, in the case of f0<f1 according to the present embodiment, such a problem does not occur and the vibration characteristic of the vibrator element 6 can be more effectively prevented from being deteriorated.

Particularly, the beams 42 to 45 are formed to have lengths along the A axis longer than lengths along the B axis in the present embodiment. Accordingly, the beams 42 to 45 are more likely to be elastically deformed along the B axis than along the A axis. That is, a relationship Ka>Kb is satisfied in which a spring constant of an elastic deformation along the A axis is Ka and a spring constant of an elastic deformation along the B axis is Kb in the spring portion of the vibrator system 100. Accordingly, the resonance frequency f0 can be effectively reduced and a difference f1−f0 between the resonance frequency f0 and the drive frequency f1 can be made larger. Therefore, an effect of attenuating the unnecessary vibration by the support substrate 4 is improved. The spring constants Ka and Kb preferably satisfy 0.2≤Kb/Ka≤0.8, more preferably satisfy 0.3≤Kb/Ka≤0.7, and still more preferably satisfy 0.4≤Kb/Ka≤0.6. Accordingly, the spring constant Kb can be made sufficiently small while ensuring a mechanical strength of the beams 42 to 45. Therefore, the effect of attenuating the unnecessary vibration by the support substrate 4 is further improved. However, the present disclosure is not limited thereto. Alternatively, a relationship Ka≤Kb may be satisfied.

Next, FIG. 7 is a graph showing a relationship between f1/fd and a displacement amplitude magnification (gain) of a vibration of the vibrator element 6 along the B axis at the drive frequency f1, in which the frequency of the unnecessary vibration which is a vibration of the vibrator element 6 along the B axis is fd. A "displacement amplitude" is a maximum amplitude of a dimensional displacement during a vibration, and the "displacement amplitude magnification" is a magnification of displacement amplitude to a displacement amplitude when f1/fd is 0.01. A curve Q1 in the graph represents the vibrator structure body 10 according to the present embodiment, a curve Q2 represents the vibrator structure body 10 according to a second embodiment to be described later, and a curve Q3 represents a vibrator element according to a comparative example that is disclosed in Patent Literature 1.

As described above, since the frequency fd of the unnecessary vibration is substantially equal to the drive frequency f1, a relationship f1/fd=1 is satisfied. If a comparison is made relative to f1/fd=1 in FIG. 7, it can be known that a displacement amplitude magnification (gain) of the vibrator structure body 10 according to the present embodiment is smallest, a displacement amplitude magnification (gain) of the vibrating structure 10 according to the second embodiment to be described later is smaller, and a displacement amplitude magnification (gain) of a vibrator element according to the comparative example is largest. Since a smaller displacement amplitude magnification (gain) indicates a smaller amplitude of the mass portion in the vibrator system 100, that is, the vibrator element 6 in the direction along the B axis, the unnecessary vibration of the vibrator element 6 can be more effectively attenuated in the vibrator structure body 10 according to the present embodiment.

FIG. 8 is a graph showing, when the frequency ratio f1/fd=1, a relationship between f0/f1 and a displacement amplitude magnification (gain) of a vibration of the vibrator element 6 along the B axis at the drive frequency f1. The f0/f1 is a ratio of the resonance frequency f0 of a vibration of the vibrator system 100 along the B axis and the drive frequency f1. It can be known from FIG. 8 that a smaller f0/f1, that is, a larger difference between the resonance frequency f0 and the drive frequency f1: f1−f0, indicates a smaller displacement amplitude magnification (gain). The displacement amplitude magnification (gain) is less than 0.8 in the present embodiment. The displacement amplitude magnification (gain) of the vibrator element according to the comparative example is 0.8. Therefore, a better effect of attenuating the unnecessary vibration compared to the comparative example can be obtained if the displacement amplitude magnification (gain) is at least less than 0.8. The displacement amplitude ratio (gain) is preferably less than 0.6, more preferably less than 0.4, and still more preferably less than 0.2. Accordingly, a more significant effect of attenuating the unnecessary vibration can be obtained.

It can be known from FIG. 8 that the displacement amplitude magnification is less than 0.8 as long as f0/f1 is less than 0.7, the displacement amplitude magnification is less than 0.6 as long as f0/f1 is less than 0.65, the displacement amplitude magnification is less than 0.4 as long as f0/f1 is less than 0.55, and the displacement amplitude magnification is less than 0.2 as long as f0/f1 is less than 0.4. That is, f0/f1 is preferably less than 0.7, more preferably less than 0.65, still more preferably less than 0.55, and yet still more preferably less than 0.4.

The vibrator device 1 is described above. As described above, the vibrator device 1 includes the vibrator structure body 10. When the A axis, the B axis and the C axis are three axes orthogonal to each other, the vibrator structure body 10 includes the vibrator element 6 and the support substrate 4 that is aligned with the vibrator element 6 along the C axis, and the vibrator element 6 includes the drive arms 75, 76, 77, and 78 that flexurally vibrate along the plane parallel to the A axis and the B axis and along the A axis. The support substrate 4 includes the base 40 that supports the vibrator element 6, the support 41 that supports the base 40, and the beams 42, 43, 44, and 45 that couple the base 40 and the support 41. The relationship f0<f1 is satisfied in which the resonance frequency of the vibration of the vibrator structure body 10 along the B axis is f0 and the drive frequency of the vibrator element 6 is f1. In this manner, by satisfying the relationship f0<f1, it is possible to generate a difference between the frequency of the unnecessary vibration, which is substantially equal to f1, and the resonance frequency f0, and a resonance of the vibrator system 100 in response to the unnecessary vibration can be prevented. Therefore, the unnecessary vibration of the vibrator element 6 can be effectively attenuated by the support substrate 4.

As described above, the relationship Ka>Kb is satisfied in which the spring constant of the elastic deformation of the beams 42, 43, 44 and 45 along the A axis is Ka and the spring constant of the elastic deformation of the beams 42, 43, 44 and 45 along the B axis is Kb. In the plan view from the direction along the C axis, the support 41 includes the first support 411 positioned at one side of the A axis with respect to the vibrator element 6, that is, the positive side of the A axis in the present embodiment, and the second support 412 positioned at the other side of the A axis, that is, the negative side of the A axis in the present embodiment. As described above, the first and second supports 411 and 412 are provided on both sides of the vibrator element 6 so that the vibrator element 6 can be supported in a more stable manner. Therefore, the vibration characteristic of the vibrator element 6 is stabilized. In addition, the first and second supports 411 and 412 are aligned along the A axis so that the beams 42, 43, 44, and 45 which couple the base 40 and the first and second supports 411 and 412 are easily formed to have lengths along the A axis longer than lengths along the B axis, and the relationship Ka>Kb is likely to be satisfied. Therefore, the degree of freedom of the design of the support substrate 4 increases.

As described above, the vibrator substrate 6 includes the element base 70, the detection arms 71 and 72 extending from the element base 70 towards both sides of the B axis, the first coupling arm 73 extending from the element base 70 along the A axis, the second coupling arm 74 extending from the element base 70 along the A axis towards an opposite side to a direction in which the first coupling arm 73 extends, the drive arms 75 and 76 that serve as vibrating arms extending from the tip end of the first coupling arm 73 towards both sides of the B axis, and the drive arms 77 and 78 that serve as vibrating arms extending from the tip end of the second coupling arm 74 towards both sides of the B axis. The element base 70 is fixed on the base 40 via the joining members B2. Accordingly, the unnecessary vibration of the vibrator element 6 which is a physical quantity sensor element that detects a physical quantity can be more effectively attenuated, and the vibrator device 1 with high accuracy can be implemented.

As described above, the displacement amplitude magnification (gain) of the vibration of the vibrator element 6 along the B axis at the drive frequency f1 is less than 0.8. Accordingly, the unnecessary vibration of the vibrator element 6 can be more effectively attenuated by the support substrate 4.

As described above, the vibrator element 6 includes the vibrator substrate 7 and the electrode 8 that is provided on the vibrator substrate 7. The vibrator substrate 7 and the support substrate 4 are formed of quartz crystal substrates having the same cut angle. Accordingly, the thermal expansion coefficients of the support substrate 4 and the vibrator substrate 7 can be set to be equal to each other. Therefore, a thermal stress caused by a difference between the thermal expansion coefficients of the support substrate 4 and the vibrator substrate 7 is substantially not generated, and the vibrator element 6 is less likely to be subject to the stress. Therefore, the vibration characteristic of the vibrator element 6 can be more effectively prevented from deteriorating and changing.

As described above, the support substrate 4 overlaps the drive arms 75, 76, 77, and 78 in the plan view from the direction along the C axis. Therefore, the support substrate 4 functions as a stopper for preventing the drive arms 75 to 78 from being excessively deformed in the direction along the C axis, and the vibrator element 6 can be effectively prevented from being broken down.

As described above, the vibrator element 6 is a physical quantity sensor element that detects a physical quantity. Particularly, the vibrator element 6 is an angular velocity sensor element that detects the angular velocity ωc according to the present embodiment. Accordingly, the vibrator device 1 can be mounted in various types of electronic apparatus, and the vibrator device 1 has high convenience.

In the first embodiment as described above, the support substrate 4 is positioned between the vibrator element 6 and the circuit element 3 and supports the vibrator element 6 from the lower side, that is, from the negative side of the C axis. Alternatively, the vibrator element 6 may be positioned between the support substrate 4 and the circuit element 3 and the support substrate 4 support the vibrator element 6 from the upper side, that is, from the positive side of the C axis. In the first embodiment, the support substrate 4 is fixed on the bottom surface of the recess 211a of the base 21 via the joining members B1. Alternatively, the support substrate 4 may be fixed on the circuit element 3 via a joining member.

Second Embodiment

Figure 9:
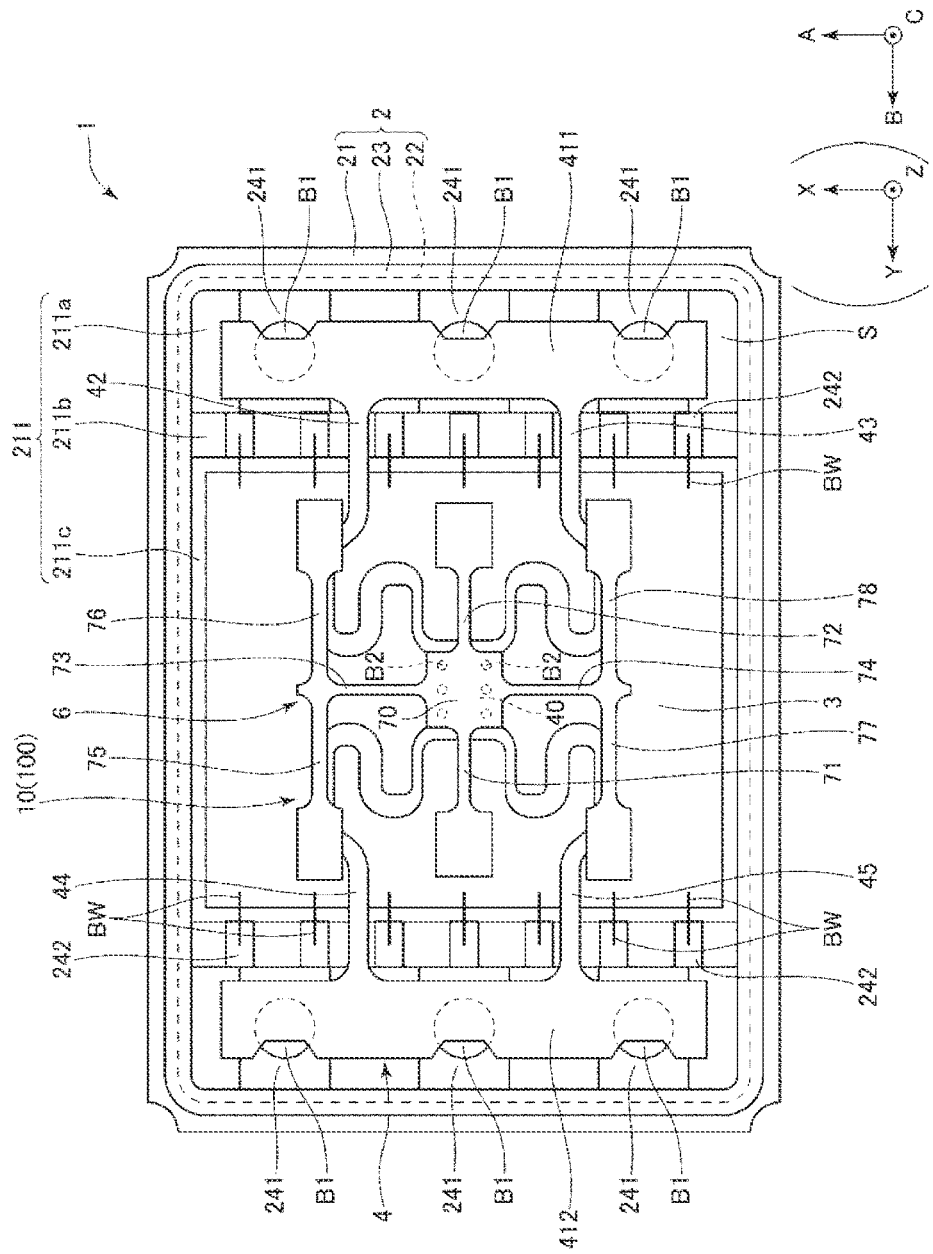
FIG. 9 is a plan view showing a vibrator device according to a second embodiment.

FIG. 9 is a plan view showing a vibrator device according to the second embodiment.

The second embodiment is similar to the first embodiment except for a difference in a direction of the vibrator element 6. In the following description, the present embodiment will be described with a focus on the difference from the above-described embodiment, and a description of similar matters will be omitted. In FIG. 9, the same reference numerals are given to configurations similar to configurations according to the above-described embodiment, and descriptions thereof are omitted.

As shown in FIG. 9, components other than the vibrator element 6 on the support substrate 4 according to the present embodiment, that is, the package 2, the support substrate 4, and the circuit element 3 are rotated around the C axis by 90° with respect to the components according to the first embodiment. That is, the support substrate 4 includes the base 40, the support 41 including a first support 411 and a second support 412 that support the base 40 and are separately provided on both sides of the base 40 along the B axis, the pair of beams 42 and 43 that couple the base 40 and the first support 411, and the pair of beams 44 and 45 that couple the base 40 and the second support 412. The element base 70 of the vibrator element 6 is fixed on the base 40 via the conductive joining members B2, and the first support 411 and the second support 412 are separately fixed on the bottom surface of the recess 211a via the joining members B1. According to such a configuration as well, the unnecessary vibration of the vibrator element 6 can be effectively attenuated by the support substrate 4 as indicated by the curve Q2 in FIG. 7. The direction of the crystallographic axis of the support substrate 4 does not rotate around the C axis, and remains the same as in the above-described first embodiment.

As described above, according to the vibrator device 1 in the present embodiment, the unnecessary vibration of the vibrator element 6 can be effectively attenuated by the support substrate 4, and the vibrator element 6 can be supported in a stable manner by providing the first and second supports 411 and 412 on both sides of the vibrator element 6. Therefore, the vibration characteristic of the vibrator element 6 is stabilized.

Third Embodiment

Figure 10:
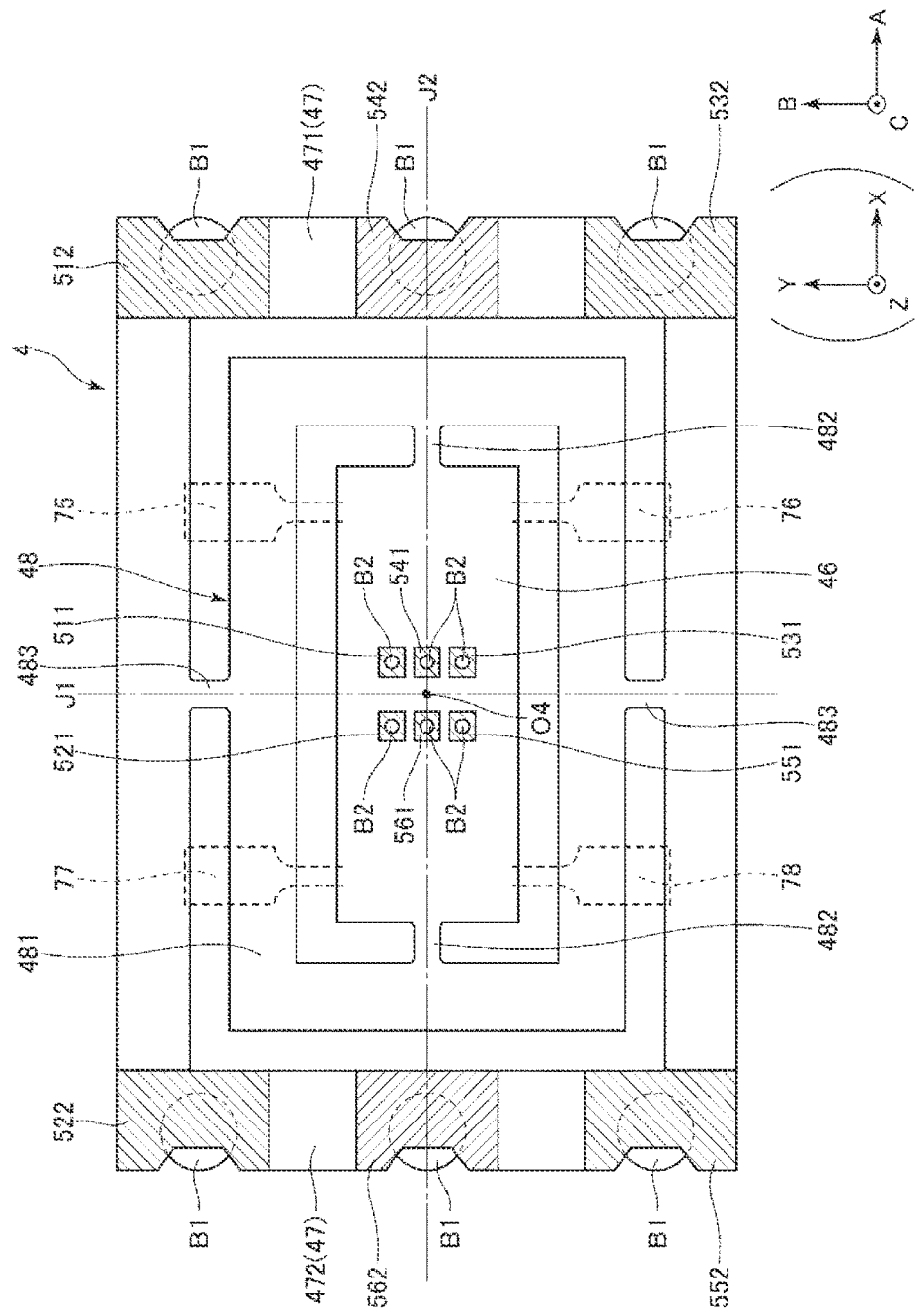
FIG. 10 is a plan view showing a support substrate that is provided in a vibrator device according to a third embodiment.

FIG. 10 is a plan view showing a support substrate that is provided in a vibrator device according to the third embodiment.

The third embodiment is similar to the first embodiment except for a difference in a configuration of the support substrate 4. In the following description, the present embodiment will be described with a focus on the difference from the above-described embodiments, and a description of similar matters will be omitted. In FIG. 10, the same reference numerals are given to configurations similar to configurations according to the above-described embodiments.

As shown in FIG. 10, the support substrate 4 according to the present embodiment has a gimbal shape. That is, the support substrate 4 includes a base 46 that is positioned at a central portion of the support substrate 4 and on which the vibrator element 6 is fixed via the joining members B2, a support 47 that surrounds the base 46, supports the base 46, and is fixed on the bottom surface of the recess 211a via the joining members B1, and a beam 48 that is positioned between the base 46 and the support 47 and couples the base 46 and the support 47.

The beam 48 is positioned between the base 46 and the support 47 and includes a frame-shaped frame portion 481 that surrounds the base 46, first beams 482 that couple the base 46 and the frame portion 481, and second beams 483 that couple the support 47 and the frame portion 481. The first beams 482 couple the base 46 and the frame portion 481 at a central portion of the first beams 482 in a direction along the B axis. A central axis J2 of the first beams 482 is along the A axis. On the other hand, the second beams 483 couple the support 47 and the frame portion 481 at a central portion of the second beam 483 in a direction along the A axis. A central axis J1 of the second beams 483 is along the B axis. That is, the central axis J1 and the central axis J2 are orthogonal to each other, and an intersection point of the central axis J1 and the center axis J2 substantially coincides with a center O4 of the support substrate 4. Alternatively, the central axis J1 and the central axis J2 may intersect with each other by an angle greater than 0° and smaller than 90°, and the intersection point of the central axis J1 and the center axis J2 may deviate from the center O4.

The support 47 has a rectangular frame shape, and includes a first support 471 positioned at a positive side of the A axis with respect to the vibrator element 6 and a second support 472 positioned at the negative side of the A axis in a plan view. The first support 471 and the second support 472 are separately fixed on the bottom surface of the recess 211a via the joining members B1.

According to such a configuration as well, the same effect as in the above-described first embodiment can be obtained. Although the support 47 has a frame shape in the present embodiment, the present disclosure is not limited thereto. Alternatively, the support 47, for example, may have a C shape in which a part of the support 47 in a circumferential direction is deficient. The same applies to the frame portion 481.

Fourth Embodiment

Figure 11:
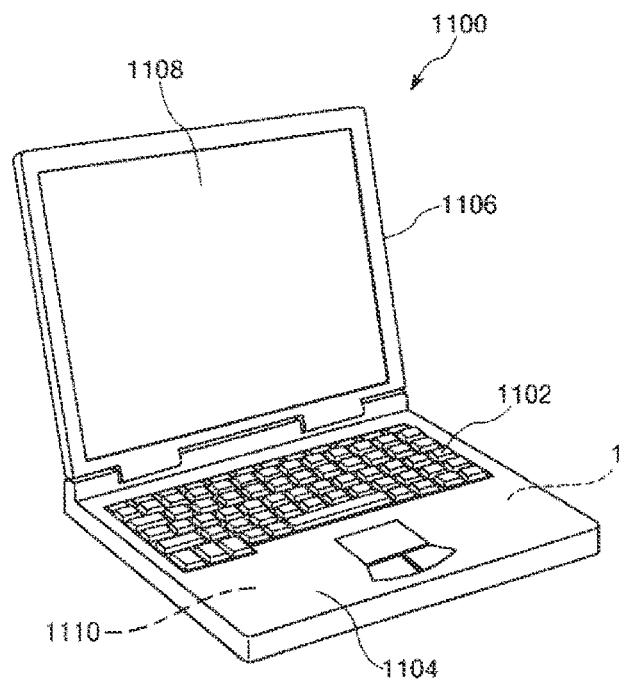
FIG. 11 is a perspective view showing a personal computer according to a fourth embodiment.

FIG. 11 is a perspective view showing a personal computer according to the fourth embodiment.

A personal computer 1100 serving as an electronic apparatus shown in FIG. 11 includes a main body 1104 that includes a keyboard 1102, and a display unit 1106 that includes a display portion 1108. The display unit 1106 is rotatably supported with respect to the main body 1104 via a hinge structure. The personal computer 1100 is provided with the vibrator device 1 serving as a physical quantity sensor and a signal processing circuit 1110 that performs signal processing, that is, control of each component based on an output signal from the vibrator device 1.

As described above, the personal computer 1100 serving as an electronic apparatus includes the vibrator device 1 and the signal processing circuit 1110 that performs the signal processing based on the output signal from the vibrator device 1. Therefore, the personal computer 1100 can obtain the above-described effect of the vibrator device 1 and have high reliability.

Fifth Embodiment

Figure 12:
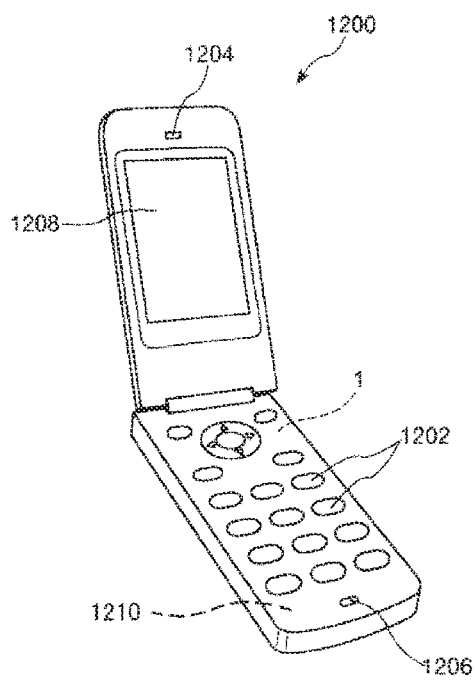
FIG. 12 is a perspective view showing a mobile phone according to a fifth embodiment.

FIG. 12 is a perspective view showing a mobile phone according to the fifth embodiment.

A mobile phone 1200 serving as an electronic apparatus shown in FIG. 12 includes an antenna (not shown), a plurality of operation buttons 1202, an earpiece 1204, a mouthpiece 1206, and a display portion 1208 provided between the operation buttons 1202 and the earpiece 1204. The mobile phone 1200 is provided with the vibrator device 1 serving as a physical quantity sensor and a signal processing circuit 1210 that performs signal processing, that is, control of each component based on an output signal from the vibrator device 1.

As described above, the mobile phone 1200 serving as an electronic apparatus includes the vibrator device 1 and the signal processing circuit 1210 that performs the signal processing based on the output signal from the vibrator device 1. Therefore, the mobile phone 1200 can obtain the above-described effect of the vibrator device 1 and have high reliability.

Sixth Embodiment

Figure 13:
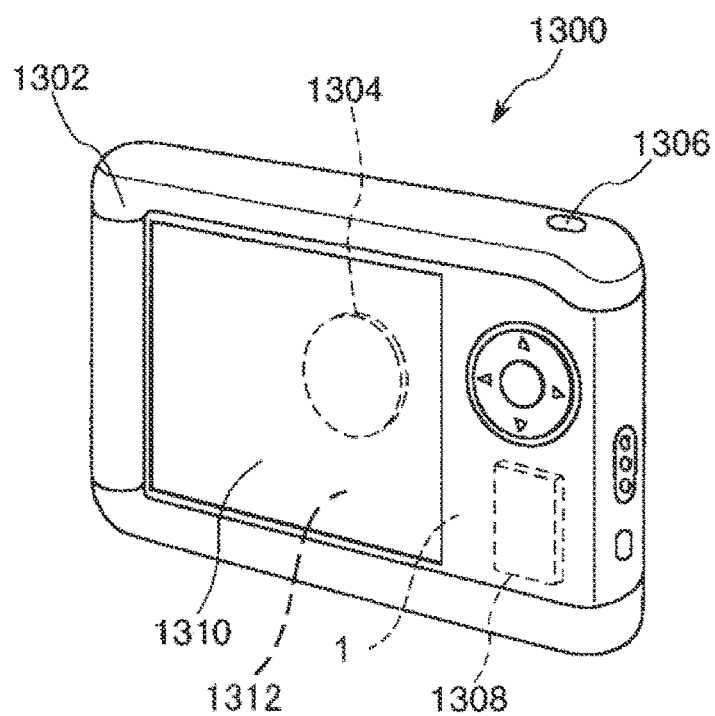
FIG. 13 is a perspective view showing a digital still camera according to a sixth embodiment.

FIG. 13 is a perspective view showing a digital still camera according to the sixth embodiment.

A digital still camera 1300 serving as an electronic apparatus shown in FIG. 13 includes a case 1302, and a display unit 1310 provided on a rear surface of the case 1302. The display unit 1310 is configured to perform displaying based on an imaging signal from a CCD, and functions as a finder that displays an object as an electronic image. A light receiving unit 1304 including an optical lens, a CCD, and the like is provided on a front side of the case 1302. When a photographer confirms an object image displayed on the display unit 1310 and presses a shutter button 1306, an imaging signal of the CCD at this time point is transferred to and stored in a memory 1308. In addition, the digital still camera 1300 is provided with the vibrator device 1 serving as a physical quantity sensor and a signal processing circuit 1312 that performs signal processing, that is, control of each component based on an output signal from the vibrator device 1.

As described above, the digital still camera 1300 serving as an electronic apparatus includes the vibrator device 1 and the signal processing circuit 1312 that performs the signal processing based on the output signal from the vibrator device 1. Therefore, the digital still camera 1300 can obtain the above-described effect of the vibrator device 1 and have high reliability.

In addition to the above-described personal computer 1100, the mobile phone 1200 and the digital still camera 1300, examples of an electronic apparatus that is provided with the vibrator device 1 may include a smartphone, a tablet terminal, a watch such as a smart watch, an inkjet discharge device such as an inkjet printer, a wearable terminal such as a head mounted displays (HMD), a television, a video camera, a video tape recorder, a car navigation device, a pager, an electronic notebook, an electronic dictionary, a calculator, an electronic game device, a word processor, a work station, a video phone, a surveillance television monitor, electronic binoculars, a POS terminal, an electronic thermometer, a sphygmomanometer, a blood glucose meter, an electrocardiogram measuring device, an ultrasonic diagnosis device, a medical device such as an electronic endoscope, a fish finder, various measuring devices, instruments such as a vehicle, an aircraft, and a ship, a base station for a portable terminal, a flight simulator, and the like.

Seventh Embodiment

Figure 14:
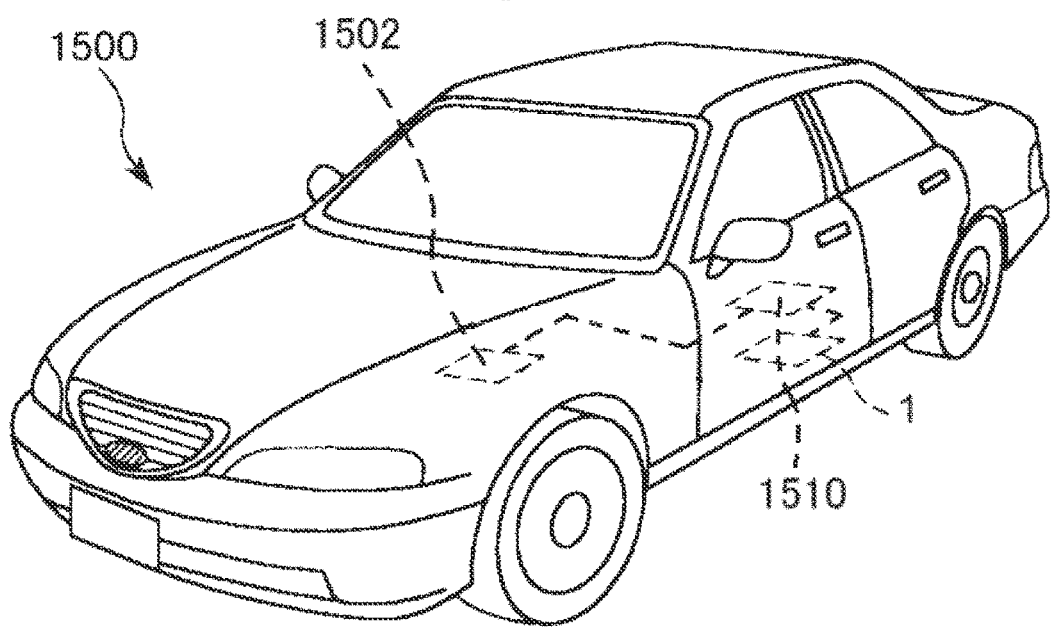
FIG. 14 is a perspective view showing an automobile according to a seventh embodiment.

FIG. 14 is a perspective view showing an automobile according to the seventh embodiment.

An automobile 1500 serving as a vehicle shown in FIG. 14 includes a system 1502 such as an engine system, a brake system, and a keyless entry system. The automobile 1500 is provided with the vibrator device 1 serving as a physical quantity sensor and a signal processing circuit 1510 that performs signal processing, that is, control of the system 1502 based on an output signal from the vibrator device 1.

As described above, the automobile 1500 serving as a vehicle includes the vibrator device 1 and the signal processing circuit 1510 that performs the signal processing based on an oscillation signal serving as an output signal from the vibrator device 1. Therefore, the automobile 1500 can obtain the above-described effect of the vibrator device 1 and have high reliability.

In addition to the automobile 1500, examples of a vehicle that is provided with the vibrator device 1 may include a robot, a drone, a motorcycle, an aircraft, a ship, an electric car, a rocket, a spacecraft, and the like.

Although the vibrator device, the electronic apparatus, and the vehicle according to the present disclosure have been described above based on the embodiments shown in the drawings, the present disclosure is not limited thereto. A configuration of each unit may be replaced with any configuration having the same function. Any other components may be added to the present disclosure. The embodiments may be combined as appropriate.

What is claimed is:

1. A vibrator device comprising:
   three axes orthogonal to each other being defined as an A axis, a B axis, and a C axis;
   a vibrator element including an element base and a vibrating arm, the vibrating arm extending in a B axis direction along the B axis; and
   a support substrate including a base and a support, the base overlapping the element base when viewed along a C axis direction along the C axis, the support being connected to the base via a beam,
   wherein the vibrating arm is configured to flexurally vibrate in an A axis direction along the A axis, and
   $f0<f1$, wherein
   $f0$ is a resonance frequency which is a frequency based on the vibrator element, the base, and the beam, and
   $f1$ is a drive frequency of the vibrator element.

2. The vibrator device according to claim 1, wherein when viewed along the C axis direction,
   the support includes:
   a first support arranged on a positive side of the A axis; and
   a second support arranged on a negative side of the A axis, wherein the base is arranged between the first support and the second support.

3. The vibrator device according to claim 1, wherein when viewed along the C axis direction,
   the support includes:
   a first support arranged on a positive side of the B axis; and
   a second support arranged on a negative side of the B axis, wherein the base is arranged between the first support and the second support.

4. The vibrator device according to claim 1, wherein when viewed along the C axis direction,
   the support surrounds the base,
   the beam is arranged between the base and the support, and the beam includes:
   a frame portion surrounding the base;
   a first beam connecting the base and the frame portion; and
   a second beam connecting the support and the frame portion.

5. The vibrator device according to claim 4, wherein the support includes a first support arranged on a positive side of the A axis and a second support arranged on a negative side of the A axis.

6. The vibrator device according to claim 5, wherein the support has a frame shape.

7. The vibrator device according to claim 6, wherein when viewed along the C axis direction, the vibrating arm overlaps the support substrate.

8. The vibrator device according to claim 7, wherein the element base is fixed on the base via a joining member.

9. The vibrator device according to claim 8, wherein the vibrator element includes a detection arm extending from the element base in the B axis direction.

10. The vibrator device according to claim 9, wherein the vibrator element includes:
   a first coupling arm extending from the positive side of the A axis of the element base; and
   a second coupling arm extending from the negative side of the A axis of the element base, and
the vibrating arm includes:
   a first drive arm extending in the B axis direction from the first coupling arm; and
   a second drive arm extending in the B axis direction from the second coupling arm.

11. The vibrator device according to claim 1, wherein the vibrator element is a physical quantity sensor element configured to detect a physical quantity.

12. An electronic apparatus comprising:
the vibrator device according to claim 1; and
a signal processing circuit configured to perform signal processing based on an output signal from the vibrator device.

13. A vehicle comprising:
the vibrator device according to claim 1; and
a signal processing circuit configured to perform signal processing based on an output signal from the vibrator device.

* * * * *